Patented Aug. 16, 1932

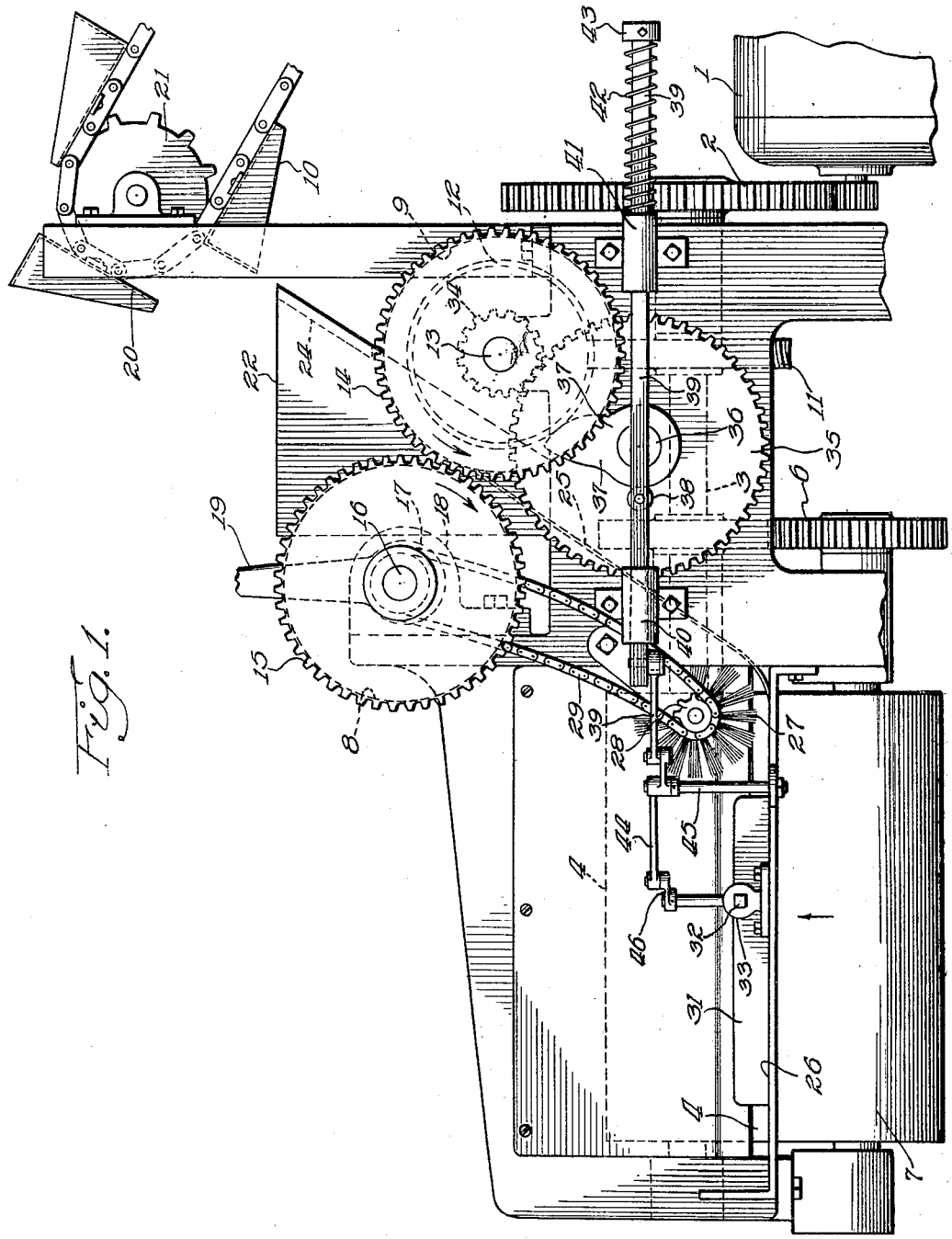

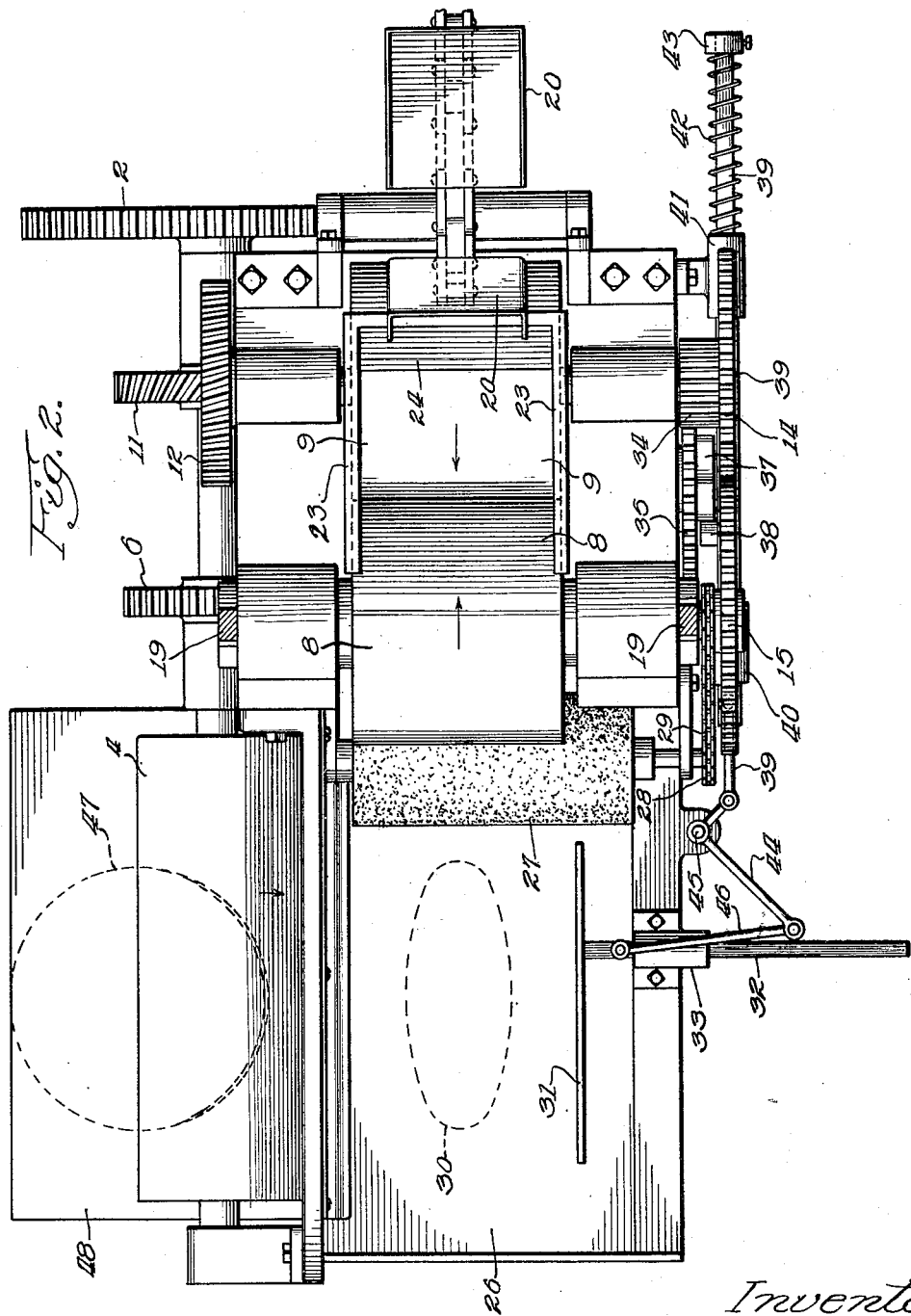

1,871,753

UNITED STATES PATENT OFFICE

DENNIS W. SMITH, OF WILMETTE, ILLINOIS, ASSIGNOR TO COLBORNE MANUFACTURING COMPANY, OF CHICAGO, ILLINOIS, A CORPORATION OF ILLINOIS

PIE CRUST ROLLER

Application filed November 17, 1930. Serial No. 496,201.

This invention relates to machines for rolling dough for various bakery purposes, particularly for rolling disk shaped piecrust or otherwise formed flat portions of dough.

The objects of the invention are to provide automatic piecrust rolling means which avoids the necessity of handling the product, back and forth rolling thereof which toughens the crust; to economize in the use of dusting flour; and to produce a uniform product at a high rate of speed.

These objects are accomplished by a construction shown in the drawings, wherein:

Figure 1 is a side view of the improved piecrust rolling machine.

Fig. 2 is a plan view of the machine.

With reference to the general features of the construction of this machine, it includes two pairs of rollers preferably arranged at right angles to each other, and in such relationship that portions of dough passing between one set of rollers may be conveniently transferred to the next set and rolled at right angles to the direction in which it was rolled by the first set of rollers.

The rollers and the means for transferring dough from one set of rollers to the other are motor driven, and the machine is also provided with a driven conveyor by means of which portions of dough, preferably of cylindrical, rectangular, or more or less spherical form according to the desired shape of the final product, are delivered to the first set of rollers and flattened in one direction thereby. When the dough leaves the second set of rollers, it is elongated in another direction and slides down an inclined platform for delivery to passing pie plates or other receiving means.

The rollers are conveniently adjusted toward and away from each other, in order that the same machine may be used for other purposes such as the rolling of dough for the making of other bakery products.

With reference to the drawings, the drive mechanism of the machine includes an electric motor 1 having a gear connection 2 to a main drive shaft 3, which carries one of the dough rollers 4, and a gear connection 6 to the shaft of a dough roller 7 opposed to roller 4. The pair of rollers 8 and 9 which first receive the portions of dough from conveyor 10, are driven by the spiral gear connection 11 and 12 between drive shaft 3 and the shaft 13 carrying roller 9. Shaft 13 also carries a gear 14 meshing with gear 15 fast to the shaft 16 of roller 8.

The rollers are adjustable toward and away from each other; for example, the eccentric bearing 17 therefor, Fig. 1, which may be adjusted angularly within the fixed bearings 17 and 18 by means of a yoke handle 19. Such adjustment carries the roller 8 toward and away from the roller 9.

The portions of dough which are brought to the first pair of rollers 8 and 9 are delivered thereto as the pocket members 20 of the conveyor pass around the sprocket 21. A guide member 22, comprising side walls 23 and a rear wall 24, is mounted between the delivery end of the conveyor and the set of rollers 8 and 9, to prevent dough or dusting flour from falling past the edges of the rollers.

If the portions of dough delivered to the rollers 8 and 9 are cylindrical or substantially spherical, then these rollers serve to roll such portions of dough into flat elliptical form. As the dough leaves the rollers 8 and 9, it slides down an inclined chute 25, which at its lower end curves into a horizontal platform 26. It is delivered to the platform 26 by the aid of a rotating brush 27. This brush carries a sprocket 28, and is driven through this sprocket and a chain 29 extending between sprocket 28 and a sprocket on the shaft 16 of roller 8.

The elliptically rolled dough, as indicated at 30, Fig. 2, and on the platform 26, is pushed along the platform to between the rollers 4 and 7 by means of a reciprocating pusher 31 resting upon platform 26 and rigid with the guide shaft 32, passing through the fixed bearing 33. The pusher and the shaft 32 are reciprocated by mechanism receiving motion from pinion 34 fast to shaft 13, Fig. 1. The pinion meshes with a gear 35, with which is rotatably connected on a short shaft 36, a cam 37. The cam coacts with a roller 38 on a bar 39 slidable within the fixed bearings 40 and 41. The bar 39 is shifted in one direction by the cam and returned by a spring 42, compressed between bearing 41 and a collar 43 on the end of a bar. At its forward end the bar 39 is pivotally connected to a bell crank lever 44 which oscillates on post 45, and is connected by a link 46 to the pusher bar 32. The reciprocation of the latter with the pusher element 31 serves to deliver the elliptically formed portions of dough 30 to the rollers 4 and 7, by which the dough is rolled at right angles to the first direction of rolling, changing its form from substantially elliptical to substantially a disk form 47, as indicated in Fig. 2.

The disks of dough then slide down the inclined platform 48 where they are delivered to pie plates which are conveyed past the platform by mechanism which may cooperate with pie filling means operated in timed relationship with the dough roller.

In the operation of the dough rolling machine, the two pairs of rollers 8—9 and 4—7 are continuously rotated toward each other in the directions indicated by the arrows on the drawings, by means of a gear drive connection to motor 1, Figure 1.

The conveyor 10 is also driven at a rate corresponding to the desired delivery rate of the dough roller. The portions of dough which are delivered by the conveyor to the first pair of rollers 8 and 9 are preferably of cylindrical or spherical form, in case the machine is used for rolling piecrust, and are changed from this form into flat elliptical portions of dough by means of the rollers 8 and 9. These partly rolled elliptical portions of dough slide down the chute 25, in the direction of their longer axes, and are brushed along to in front of the pusher 31 by rotating brush 27, and then are slid by the pusher to between the rollers 4 and 7, which serve to roll the elliptical portions of dough in the direction of their shorter axes, and deliver them in substantially disk form to the inclined platform 48.

While but one specific embodiment of this invention is herein shown and described, details thereof may be altered without departing from the claim.

I claim:

A dough rolling machine comprising a drive mechanism, two pairs of rollers driven by said mechanism, means for conveying portions of dough successively to one pair of rollers which serve to roll such portions into flat elongated forms, a chute extending downwardly from said pair of rollers and terminating in a horizontal extension thereof in front of the second pair of rollers, a rotary feed brush for urging the dough along said chute, and reciprocating means for delivering the elongated formed portions of dough in the direction of their shorter axes to the second pair of rollers.

Signed at Chicago this 13th day of November, 1930.

DENNIS W. SMITH.